(No Model.)

J. M. GRIEST.
MECHANICAL MOVEMENT

No. 250,233.　　　　　　　　　Patented Nov. 29, 1881.

Witnesses,　　　　　　　　　Inventor,
　　　　　　　　　　　　　　John M. Griest
　　　　　　　　　　per. F. F. Warner
　　　　　　　　　　　　　his Attorney.

UNITED STATES PATENT OFFICE.

JOHN M. GRIEST, OF CHICAGO, ILLINOIS.

MECHANICAL MOVEMENT.

SPECIFICATION forming part of Letters Patent No. 250,233, dated November 29, 1881.

Application filed May 9, 1881. (No model.)

*To all whom it may concern:*

Be it known that I, JOHN M. GRIEST, of Chicago, in the county of Cook and State of Illinois, have invented certain new and useful Improvements in Mechanical Movements, of which the following, in connection with the accompanying drawings, is a specification.

Figure 1:
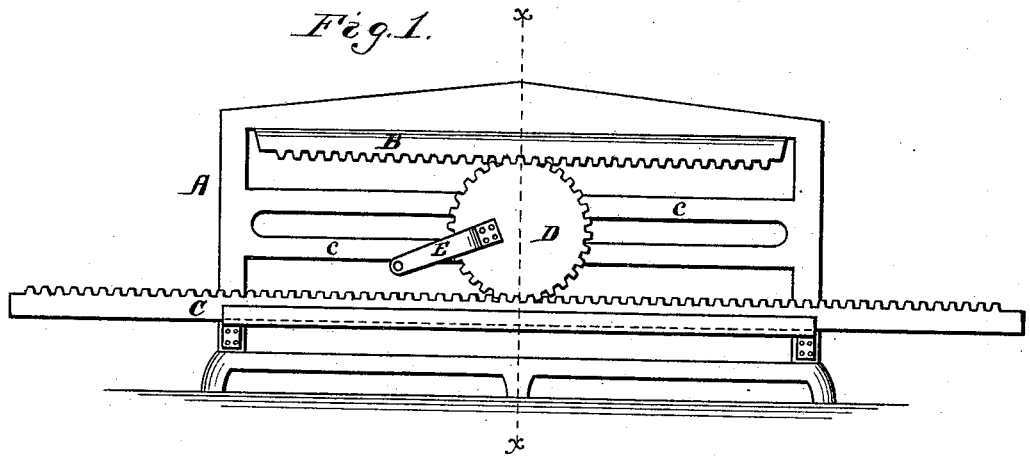
Figure 2:
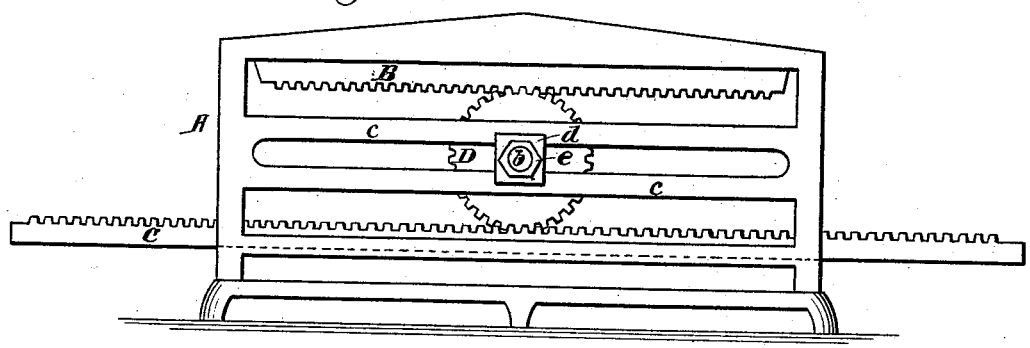
Figure 3:
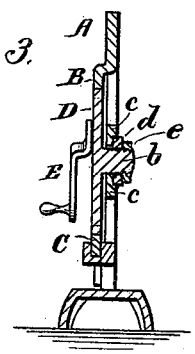

Figure 1 is a front elevation of a mechanical movement embodying my invention. Fig. 2 is a rear elevation thereof, and Fig. 3 is a section in the plane of the line $x\,x$ of Fig. 1.

Like letters of reference indicate like parts.

In the drawings, A represents a frame or support for the moving parts, hereinafter described.

B is a fixed rack on the said frame, and C is a sliding rack moving in a way or guide-bed, $a$.

D is a spur-wheel arranged between and engaging the racks B and C. This wheel has a hub, $b$, and upon the rear part of this hub is a block or lug, $d$, overlapping the guide-bar $c$ of the frame A. A nut, $e$, is run upon the end of the said hub, as shown in Figs. 2 and 3.

E is a crank applied to and rotating with the wheel D.

The operation of the device now described is as follows: By rotating the wheel D by means of the crank E the wheel will travel along the fixed rack B, and as it travels it will carry with it the movable rack C; but the rotation of the wheel D while traveling will, by reason of its rotation, also move the rack C along the same as if the said wheel were rotated while stationary; hence the rack C will travel faster in its way than the wheel travels on the rack B. In other words, the movement of the rack C will be equal to the travel of the wheel D on the rack B plus the movement caused directly by the rotation of the said wheel on the rack C. The block $d$, in conjunction with the bar $c$ and nut $e$, will hold the wheel D in its proper position with relation to the racks.

This device may be applied to use with advantage for the purpose of changing the direction of motion and producing an increase of rectilinear movement. For example, the wheel D may be rocked or rotated by means of a vertically-moving pitman jointed to the crank E, when the movement of the rack C will be in a horizontal direction and greatly exceed the stroke of the pitman. The crank, being applied to and rotating with the wheel, operates as a lever, with the advantages usually following the use of a lever in devices of this class.

I do not here intend to restrict myself to the precise means herein shown and described for supporting the wheel and movable rack. The wheel D need not be cogged all the way around its periphery.

Having thus described my invention, what I claim as new, and desire to secure by Letters Patent, is—

The combination of the fixed rack B, the movable rack C, the cogged traveling wheel, and its crank and supporting parts for the said wheel and movable rack, substantially as and for the purposes specified.

JOHN M. GRIEST.

Witnesses:
HENRY FRANKFURTER,
F. F. WARNER.